Nov. 3, 1953  G. R. CUTHBERTSON ET AL  2,657,730
PNEUMATIC TIRE AND METHOD OF MAKING SAME
Filed July 31, 1951
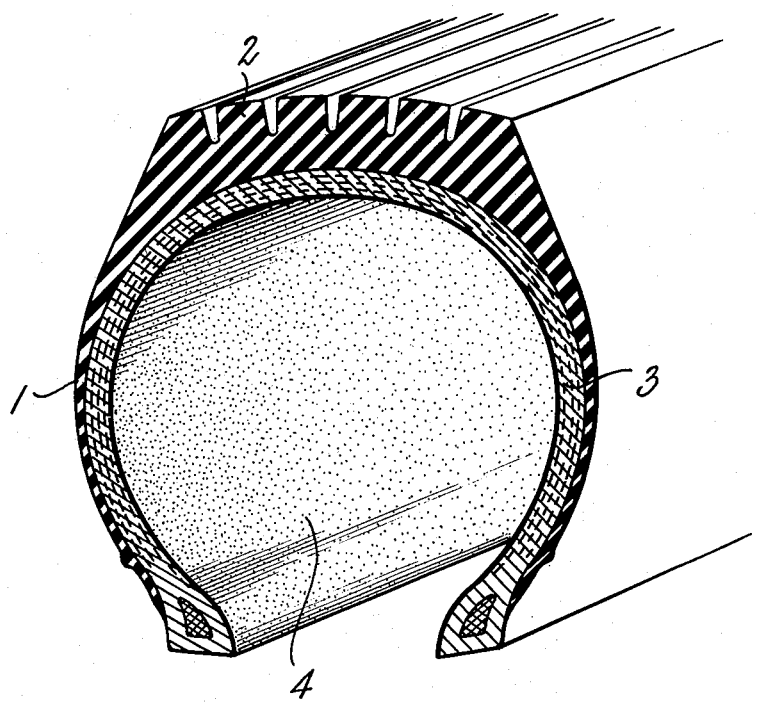
INVENTORS
GEORGE R. CUTHBERTSON
HOWARD McW. BUCKWALTER
ARTHUR C. DANIELSON
BY James J. Long
AGENT

UNITED STATES PATENT OFFICE 2,657,730

PNEUMATIC TIRE AND METHOD OF MAKING SAME

George R. Cuthbertson and Howard M. Buckwalter, Detroit, and Arthur C. Danielson, Royal Oak, Mich., assignors to United States Rubber Company, New York, N. Y., a corporation of New Jersey Application July 31, 1951, Serial No. 239,564

11 Claims. (Cl. 152—354)

This invention relates to an improved method of preventing cracking or checking of the side walls of pneumatic tires, as well as to improved pneumatic tires obtained by such method.

It is a principal object of the present invention to provide a method of preventing cracking or checking of the side walls of a pneumatic tire. Such cracking is believed to be occasioned by the presence of ozone in the atmosphere, and is usually referred to as ozone checking.

Another object is the provision of a method of preventing such ozone checking without impairing the service life of the tire.

Still a further object of the invention is to provide an improved tire that is resistant to ozone checking and that is characterized by good resistance to failure from ply separation.

In the accompanying drawing, the single figure represents in cross section a pneumatic tire made in accordance with the invention.

According to the invention a pneumatic tire is prepared by adding to the vulcanizable rubber stock comprising the side wall of the tire a small amount of a nickel dialkyl dithiocarbamate, and assembling such side wall composition with the usual tire tread portion and a carcass portion comprising a plurality of plies of tire fabric coated on each side with a thin layer of vulcanizable rubber carcass stock. The assembled tire is shaped and vulcanized in the conventional manner. The invention further contemplates incorporating within the carcass of the vulcanized tire a small amount of a primary aryl diamine. It has been found that the improved pneumatic tire made in this manner possesses remarkable resistance to ozone checking of the side walls, and the service life of the tire is high as evidenced by the fact that the tire can be run for extended periods without encountering separation of the plies, or other types of failure.

In practicing the invention the nickel dialkyl dithiocarbamate may be added to the side wall rubber stock in any suitable manner, as by mixing the chemical with the rubber stock on a roll mill along with the usual compounding ingredients, including the usual accelerator, activators, vulcanizing agent, antioxidants, etc. The nickel dialkyl dithiocarbamate employed is one in which the alkyl groups are lower alkyl groups, e. g., nickel dibutyl dithiocarbamate. Nickel dibutyl dithiocarbamate is preferred. The nickel dialkyl dithiocarbamate is included in the vulcanizable rubber stock in addition to the conventional accelerator, which may be any of the usual accelerators commonly employed in tire stocks, and which is employed in sufficient amount to effect adequate acceleration of the stock so that the stock is vulcanizable within the time and temperature ranges employed in the manufacture of tires. Relatively small amounts of nickel dialkyl dithiocarbamate are effective to produce the desired resistance to ozone checking. It is generally preferred to use at least 0.2 part by weight of nickel dialkyl dithiocarbamate per 100 parts of rubber, and more preferably we employ from about 0.5 to 3 parts. Although larger amounts than about 3 or 5 parts may be used if desired, they are generally without appreciable increased benefit as a practical matter, and therefore, for reasons of economy, they are not usually employed. Such amounts of nickel dialkyl dithiocarbamate are used in addition to the usual amount of accelerator. This side wall composition is then given its preliminary shaping, suitably by the conventional extrusion operation, wherein it is united with an abrasion resistant tread portion.

The carcass of the tire may be built up in band form on a collapsible tire building drum in the conventional manner, and the tread and side wall portion superimposed on this, after which the tire is shaped and vulcanized in the usual equipment.

It is found that the pneumatic tire made in this manner has excellent ozone checking resistance, as evidenced by tests and service observations. However, it is at the same time observed that such tires in which a nickel dialkyl dithiocarbamate has been incorporated are subject to premature failure due to separation of the carcass plies from each other. For some reason that is not well understood, the nickel dialkyl dithiocarbamate has an extremely deleterious effect on certain physical properties of the vulcanized rubber stock, specifically the carcass stock. More especially, the tensile strength of the carcass stock is affected, and the adhesion between the carcass cords and the rubber deteriorates, so that in a relatively short time after the tire is put in use the plies begin to separate and the tire becomes useless. Therefore, as a practical matter, the beneficial effects of the nickel dialkyl dithiocarbamate on ozone checking resistance of the side wall do not result in an improved tire as thus far described.

According to the invention, the vulcanized tire having a nickel dialkyl dithiocarbamate incorporated in the side walls prior to vulcanization, is subjected to a further treatment, which comprises incorporating a primary aryl diamine in the vulcanized carcass portion. This is conveniently accomplished by diffusion of the primary aryl diamine into the vulcanized carcass. This may be accomplished by applying to the vulcanized tire carcass a composition including a primary aryl diamine in any suitable manner, as by dusting, spraying, brushing, or dipping. Also, the primary aryl diamine may be incorporated by placing the vulcanized tire in an atmosphere of primary aryl diamine vapor. Although the treatment may be carried out at room temperature, the diffusion of the primary aryl diamine into the tire is greatly accelerated by heat. In the preferred practice of the invention the interior surface of the vulcanized tire casing, that is, the band ply surface, is painted with a primary aryl diamine and then stored in a saturated atmosphere of the primary aryl diamine vapor at an elevated temperature, preferably in excess of 100° F., e. g., 140 to 160° F., for an extended period of time, preferably in excess of two days, e. g., 3 to 4 days, sufficient for the primary aryl diamine to diffuse throughout the vulcanized carcass stock. Higher temperatures than 160° F. may be used in the treatment if desired, but the temperature should not be so high that the vulcanized tire is adversely affected due to exposure to excessive heat. Longer treatment times than 96 hours may be employed if desired, e. g., 6 days or even more, particularly at the lower treating temperatures, but usually there is no appreciable added benefit in extending the treatment beyond about 4 days, if the treating temperature is in the neighborhood of 160° F. It is found that when the primary aryl diamine is incorporated in the vulcanized carcass stock, the deleterious effect of the nickel dibutyl dithiocarbamate on the adhesion of the carcass plies is eliminated, and the resulting tire has satisfactory service life. This treatment with a primary aryl diamine in no way overcomes the beneficial effects of the nickel dialkyl dithiocarbamate on ozone checking resistance.

The primary aryl diamines in general are operable in the invention. By way of example, it may be mentioned that m-phenylene diamine, m-toluylenediamine, and the like, are suitable. Any of the foregoing are conveniently introduced to the tire carcass by diffusion, that is, by painting or spraying it on the interior surface of the finished tire casing containing a nickel dialkyl dithiocarbamate in the side wall, and permitting the primary aryl diamine to diffuse into the carcass. The treating chemical is most conveniently applied by brushing a water solution of the chemical onto the carcass surface. The solution may be suitably thickened to a proper brushing consistency, as by mixing a methyl cellulose paste or other thickener therewith. Sufficient primary aryl diamine is preferably introduced into the tire in this manner to produce in the carcass a concentration in excess of about 0.1% by weight of the tire, and more preferably a concentration of from about 0.2 to 0.5%. Somewhat higher concentrations, e. g., 1% or more are generally without appreciably greater benefit, but they are ordinarily without deleterious effect, and may be employed if desired.

A specific example of the invention will now be described.

A rubber side wall stock of the following composition was prepared:

| | Parts by weight |
|---|---|
| Rubber | 100 |
| Carbon black | 45 |
| Stearic acid | 3 |
| Zinc oxide | 3 |
| Antioxidant | 1.5 |
| Softener | 5 |
| Nickel dibutyl dithiocarbamate | 1.5 |
| Mercaptobenzothiazole | 0.9 |
| Sulfur | 2.75 |

This was formed into pneumatic tire casings in the conventional manner, comprising, as illustrated in the drawing, a side wall 1 united with a tire tread portion 2, in the cap and base type of construction, and associated with a carcass 3 and vulcanized in the usual way.

The carcass stock had the following composition:

| | Parts by weight |
|---|---|
| Rubber | 100 |
| Carbon black | 30 |
| Stearic acid | 1 |
| Zinc oxide | 10 |
| Antioxidant | 2 |
| Softener | 5 |
| Mercaptobenzothiazole | 0.9 |
| Sulfur | 3.0 |

When the resulting tire was tested it was found to have excellent ozone checking resistance by reason of the nickel dibutyl dithiocarbamate which was incorporated in the side wall stock prior to vulcanization, but nevertheless the tire was virtually useless because the resistance of the carcass plies to separation was very poor. There was then applied to the interior surface of vulcanized tire casings prepared in this manner a composition comprising 4.4 parts of m-phenylene diamine and 3.6 parts of m-toluylene-diamine in 1.0 part by weight of water. This composition was brushed liberally over the entire band ply surface of the casings, forming a continuous layer 4 thereon. The amount of primary aryl diamine applied was equivalent to about 50 grams for a passenger size tire. A number of such tires were then stored in a closed hot room at 158° F. for 96 hours. The atmosphere in the room was essentially saturated with the vapor of the primary aryl diamine arising from the coatings on the interior of the tire casings. As a result of this treatment the tire contained about 0.2 to 0.5% of the primary aryl diamine. Testing and use of tires treated in this manner demonstrated the remarkably improved ozone checking resistance of the tires, while the ply separation resistance was at the same time adequate.

From the foregoing it is evident that the invention provides a convenient method of making a pneumatic tire that not only has improved resistance to ozone checking of the side walls, but also has good ply separation resistance, and therefore is capable of giving unusually long service, even in climates where exposure to ozone normally has an extremely deleterious effect on ordinary tires. The invention makes it possible to take advantage of the ability of nickel dialkyl dithiocarbamate to prevent ozone attack of the tire side walls. Such use of nickel dialkyl dithiocarbamate would ordinarily lead to very poor resistance to ply separation, but the present invention provides a method of counteracting this by incorporating a primary aryl diamine in the vulcanized carcass, and thereby surprisingly preventing premature ply separation without counteracting the beneficial effect of the nickel dialkyl dithiocarbamate on the side walls.

The exact manner in which the nickel dialkyl dithiocarbamate impairs the adhesion of the carcass plies is not understood, but the nickel dialkyl dithiocarbamate added to the side wall stock apparently migrates into the carcass rubber by diffusion, with resulting adverse effect on the physical properties of the carcass stock, particularly with respect to ply separation resistance.

Since the nickel dialkyl dithiocarbamate is not found as such in the finally vulcanized tire by chemical analysis thereof, it is probable that the adverse effect is due to decomposition products or vulcanization products of the nickel dialkyl dithiocarbamate. The commercial grade of nickel dialkyl dithiocarbamate also contains unknown impurities, including appreciable amounts of inorganic nickel compounds, and such impurities may be responsible for the impairment of the physical properties of the stock. In any event, the treatment with a primary aryl diamine as described counteracts the adverse effect of the nickel dialkyl dithiocarbamate.

It should be noted that it is essential for purposes of the invention to incorporate the primary aryl diamine into the carcass after the carcass has been vulcanized, and the benefits of the invention are not obtained if the primary aryl diamine is incorporated prior to the cure.

Having thus described our invention, what we claim and desire to protect by Letters Patent is:

1. A pneumatic tire having vulcanized rubber side wall in which a nickel dialkyl dithiocarbamate has been incorporated prior to vulcanization, and a vulcanized rubber carcass containing a primary aryl diamine.

2. A pneumatic tire having vulcanized rubber side wall in which nickel dibutyl dithiocarbamate has been incorporated prior to vulcanization, and a vulcanized rubber carcass containing a primary aryl diamine.

3. A pneumatic tire having vucanized rubber side wall in which a nickel dialkyl dithiocarbamate has been incorporated prior to vulcanization, and a vulcanized rubber carcass containing m-phenylene diamine.

4. A pneumatic tire having vulcanized rubber side walls in which nickel dibutyl dithiocarbamate has been incorporated prior to vulcanization, and a vulcanized rubber carcass having m-phenylene diamine incorporated therein subsequent to vulcanization.

5. A method of making a pneumatic tire which comprises incorporating a nickel dialkyl dithiocarbamate in a raw vulcanizable rubber side wall stock, assembling the stock in a pneumatic tire casing including a vulcanizable rubber carcass stock, vulcanizing the assembly, and incorporating a primary aryl diamine in the carcass of the vulcanized assembly by applying the said diamine to the exterior surface of the band ply of the vulcanized carcass, whereby the said diamine diffuses into the carcass.

6. A method of making a pneumatic tire which comprises incorporating nickel dibutyl dithiocarbamate in a raw vulcanizable rubber side wall stock, assembling the stock in a pneumatic tire casing including a vulcanizable rubber carcass stock, vulcanizing the assembly, and incorporating m-phenylene diamine in the carcass of the vulcanized assembly by applying the said diamine to the exterior surface of the band ply of the vulcanized carcass, whereby the said diamine diffuses into the carcass.

7. A method of making a pneumatic tire which comprises incorporating nickel dibutyl dithiocarbamate in a raw vulcanizable rubber side wall stock, assembling the stock in a pneumatic tire casing including a vulcanizable rubber carcass stock, vulcanizing the assembly, and incorporating a primary aryl diamine in the carcass of the vulcanized assembly by applying the primary aryl diamine to the exterior surface of the band ply of the vulcanized carcass and applying heat thereto to accelerate diffusion of the primary aryl diamine into the carcass.

8. A method of making a pneumatic tire which comprises incorporating nickel dibutyl dithiocarbamate in a raw vulcanizable rubber side wall stock, assembling the stock in a pneumatic tire casing including a vulcanizable rubber carcass stock, vulcanizing the assembly, and incorporating a primary aryl diamine in the carcass of the vulcanized assembly by painting a composition containing the primary aryl diamine on the exterior surface of the band ply of the vulcanized carcass and placing the tire in a warm room having an atmosphere saturated with said primary aryl diamine to accelerate diffusion of the primary aryl diamine into the carcass.

9. A method of making a pneumatic tire which comprises incorporating a nickel dialkyl dithiocarbamate in a raw vulcanizable rubber side wall stock, assembling the stock in a pneumatic tire casing including a vulcanizable rubber carcass stock, vulcanizing the assembly, and incorporating m-phenylene diamine in the carcass of the vulcanized assembly by painting a composition containing m-phenylene diamine on the exterior surface of the band ply of the vulcanized carcass and placing the tire in a warm room having an atmosphere saturated with m-phenylene diamine to accelerate diffusion of the m-phenylene diamine into the carcass.

10. A method of making a pneumatic tire which comprises incorporating nickel dibutyl dithiocarbamate in a raw vulcanizable rubber side wall stock, assembling the stock in a pneumatic tire casing including a vulcanizable rubber carcass stock, vulcanizing the assembly, and incorporating m-phenylene diamine in the carcass of the vulcanized assembly by applying m-phenylene diamine to the exterior surface of the band ply of the vulcanized carcass and applying heat thereto to accelerate diffusion of the m-phenylene diamine into the carcass.

11. A method of making a pneumatic tire which comprises incorporating nickel dibutyl dithiocarbamate in a raw vulcanizable rubber side wall stock, assembling the stock in a pneumatic tire casing including a vulcanizable rubber carcass stock, vulcanizing the assembly, and incorporating m-phenylene diamine in the carcass of the vulcanized assembly by painting a composition containing m-phenylene diamine on the exterior surface of the band ply of the vulcanized carcass and placing the tire in a warm room having an atmosphere saturated with m-phenylene diamine to accelerate diffusion of the m-phenylene diamine into the carcass.

GEORGE R. CUTHBERTSON.
HOWARD M. BUCKWALTER.
ARTHUR C. DANIELSON.

References Cited in the file of this patent

UNITED STATES PATENTS

| Number | Name | Date |
|---|---|---|
| 1,410,699 | Martin | Mar. 28, 1922 |
| 1,787,065 | Calcott et al. | Dec. 30, 1930 |
| 2,210,177 | Rader | Aug. 6, 1940 |
| 2,240,856 | Philips | May 6, 1941 |
| 2,415,028 | Bosomworth et al. | Jan. 28, 1947 |